US006948639B2

(12) United States Patent
Albisetti et al.

(10) Patent No.: US 6,948,639 B2
(45) Date of Patent: Sep. 27, 2005

(54) DEVICE FOR PACKAGING AND DISPENSING A PRODUCT, NOTABLY IN THE FORM OF A SAMPLE

(75) Inventors: Nicolas Albisetti, Clichy (FR); Mathilde Winckels, Clichy (FR); Daniel Crosnier, Offranville (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 10/846,519

(22) Filed: May 17, 2004

(65) Prior Publication Data

US 2005/0006412 A1 Jan. 13, 2005

Related U.S. Application Data

(60) Provisional application No. 60/475,774, filed on Jun. 5, 2003.

(30) Foreign Application Priority Data

May 16, 2003 (FR) .......................................... 03 05901

(51) Int. Cl.⁷ ............................................. B65D 88/54
(52) U.S. Cl. .............................. 222/321.2; 222/321.7; 222/321.9; 222/336; 222/482; 239/472; 239/492
(58) Field of Search ........................... 222/321.1, 321.2, 222/321.7, 321.9, 336, 381, 482; 239/463, 468, 472, 474, 490, 491, 492

(56) References Cited

U.S. PATENT DOCUMENTS

| | | | |
|---|---|---|---|
| 3,412,907 A | | 11/1968 | Faso |
| 3,627,206 A | * | 12/1971 | Boris ........................... 239/333 |
| 3,774,849 A | * | 11/1973 | Boris ........................... 239/338 |
| 3,897,005 A | | 7/1975 | Reiner |
| 4,175,704 A | * | 11/1979 | Cohen ......................... 239/320 |
| 4,228,931 A | * | 10/1980 | Ruscitti et al. .......... 222/321.2 |
| 5,102,018 A | * | 4/1992 | Desazars de Montgailhard, William et al. .......... 222/321.9 |
| 5,242,089 A | * | 9/1993 | Knickerbocker et al. 222/321.7 |
| 5,257,726 A | * | 11/1993 | Graf et al. ................... 222/320 |
| 5,271,532 A | * | 12/1993 | Jumel et al. .............. 222/321.9 |
| 5,277,340 A | * | 1/1994 | Van Brocklin ........... 222/321.7 |
| 5,427,280 A | * | 6/1995 | Fuchs .......................... 222/320 |
| 5,651,480 A | * | 7/1997 | Piepenstock ................. 222/341 |
| 5,709,320 A | | 1/1998 | Jimenez |
| 6,273,301 B1 | * | 8/2001 | Su ........................... 222/321.9 |

FOREIGN PATENT DOCUMENTS

| | | |
|---|---|---|
| EP | 0761314 | 3/1997 |
| EP | 1199106 | 4/2002 |
| EP | 1295811 | 3/2003 |
| FR | 2393279 | 12/1978 |
| FR | 2443980 | 7/1980 |
| FR | 2646408 | 11/1990 |
| FR | 2778639 | 11/1999 |
| FR | 2837177 | 9/2003 |
| FR | 2837178 | 9/2003 |
| WO | WO 02/094708 | 11/2002 |

* cited by examiner

*Primary Examiner*—Michael Mar
*Assistant Examiner*—Patrick Buechner
(74) *Attorney, Agent, or Firm*—Oblon, Spivak, McClelland, Maier & Neustadt, P.C.

(57) ABSTRACT

A device for packaging and dispensing of a cosmetic product which includes a container to hold the product, with the container being delineated by a body. A movable element moves relative to the container body and is capable, in response to an action exerted manually on a surface of an actuating element, of moving from a first position to a second position. The movable element incorporates a first lip intended to engage with an inner wall of the body, during at least part of its movement, thereby isolating a dose of product inside the container in a manner to cause its expulsion through at least one dispensing aperture. The movable element also includes an upper lip capable of being applied in a leaktight manner against the inner wall during at least part of its movement from the first position to the second.

62 Claims, 8 Drawing Sheets

DEVICE FOR PACKAGING AND DISPENSING A PRODUCT, NOTABLY IN THE FORM OF A SAMPLE

CROSS REFERENCE TO RELATED APPLICATIONS

This document claims priority to French Application Number 03 05901, filed May 16, 2003 and U.S. Provisional Application No. 60/475,774, filed Jun. 5, 2003, the entire contents of which are hereby incorporated by reference.

FIELD OF THE INVENTION

The present invention relates to a device for packaging and dispensing a fluid product under pressure. The invention is particularly advantageous for dispensing a product in spray form. The invention can also be particularly advantageous for a miniature spray, such as a disposable miniature spray, adapted for packaging in the form of a tester or sample for cosmetic products, such as perfumes. The product is preferably liquid.

BACKGROUND OF THE INVENTION

Discussion of the Invention

Dispensers are described in patent documents FR-A-2 778 639, EP-A-0 761 314, FR-A-2 443 980, U.S. Pat. No. 3,897,005, or U.S. Pat. No. 3,412,907. All of these devices principally suffer from at least one shortcoming related to one or more of (a) the cost of manufacture, (b) their ease of use, or (c) the quality of the spray that they are capable of producing.

In practice, because samples are not generally intended for sale, their manufacturing cost must be as low as possible. It is therefore important to have devices whose components can be readily mass produced and which can be assembled in a simple manner. In addition, the device should be capable of generating a high quality, consistent spray.

Furthermore, particularly in relation to perfumes, devices are known in which the samples are presented in the form of a small volume container (typically 1.5 ml) having a cylindrical body, notably made of glass, one end of which is closed by a bottom. The other end is open and receives a miniature pump surmounted by an actuating element incorporating an aperture to facilitate spraying of the perfume. Such a system is described in FR-A-2 646 408.

The miniature pump, like pumps in larger size containers, includes a pump body having a moving piston which travels between a first position, in which the pump body is at maximum volume, and a second position, in which the volume of the pump body is at a minimum. The pump body is in selective communication with the container via an immersion tube and an admission valve in the form of a ball. During the volume reduction phase of the pump body, the admission valve is closed. On the other hand, an outlet valve located upstream of the dispensing aperture is opened under the pressure exerted by the product. The product is dispensed in spray form.

When the user relaxes the pressure exerted on the actuating element, the piston rises under the effect of a spring to the first position, creating negative pressure inside the pump body. In this phase, referred to as the filling phase, the admission valve is opened under the effect of the negative pressure inside the pump body, and the outlet valve is closed. Similarly, during this phase, a volume of air corresponding to the volume of product transferred from the container to the pump body enters the container via a suitable vent aperture.

The above system, combining a miniature container with a pump that is also of miniature size, although satisfactory from the standpoint of simplicity of use for the consumer and in terms of the quality of the spray obtained, suffers from a major drawback related to its cost and the complexity of handling/assembling the small components that form the pump device.

Devices including a reservoir equipped with a dispensing aperture and surmounted by a moving plunger enabling a product contained in the reservoir to be pressurized thereby causing it to be expelled from the dispensing aperture are known in U.S. Pat. No. 5,709,320. However, these devices employ pistons that are complex and costly to implement inasmuch as they are respectively fitted with check valves.

Moreover, each time the piston is actuated in such devices, the entire volume located under the piston is pressurized in order to dispense a quantity of product. The ratio between the quantity of air and the quantity of product pressurized changes with each actuation. This ratio has an influence on the quality of the spray obtained. The spray obtained can therefore become inconsistent. The power of the jet and the diameter of the spray diminish at each fresh actuation. To remedy this problem, a known approach is to provide larger containers, and to fill them in excess of the number of doses to be dispensed, so that the air/product ratio remains above an acceptable level throughout the desired life of the product. This solution poses a problem, however, in that tester or sample devices are then larger than anticipated and a greater quantity of product, generally of high added value, has to be placed in the device to make it work, which runs counter to the objective of reducing the cost of the testers, which are usually distributed free of charge.

A known device intended to dispense precise and constant doses of liquids is known in FR-A-2,393,279. The liquid contained in the reservoir of such a device descends by gravity into a dosing chamber defining the volume of a dose of product expelled at each actuation of the pushbutton fitted to the reservoir. The problem posed by this kind of device is that it does not facilitate optimal discharge of the reservoir, particularly when the product is viscous or when it tends to include air bubbles. In effect, such air bubbles prevent the creation of repeatable doses. Notably, when the liquid is a perfume incorporating oils, the surface tension of the liquid relative to the inner walls of the device is high. If a bubble included in the liquid is formed between two parts of the device, for example against an aperture emerging into the dosing chamber, such a bubble can prevent the chamber from being filled with liquid in a repeatable and expected manner. The dose of liquid dispensed is then no longer guaranteed.

SUMMARY OF THE INVENTION

One of the objects of the invention is to provide a packaging and dispensing device suitable for the packaging and dispensing under pressure of sample doses of a product, for example a cosmetic, and which entirely or partially remedies the drawbacks discussed above in reference to conventional devices.

Another object of the invention is to provide a device that is economical to make and simple to use.

Additional objects and advantages of the invention will become apparent from the detailed description herein.

According to a preferred example of the invention, a device for packaging and dispensing a product is provided which includes a container to hold the product, with the container delineated by a body having a closed bottom. A movable element is movable relative to the body of the container and capable, in response to an action or force exerted manually on a surface of an actuating element, of moving from a first position in which a first lip of the movable element is at a non-zero distance from an inner wall to a second position in which the first lip is engaged with the inner wall. In addition, the movable element includes an upper lip capable of bearing in a leaktight manner against the inner wall over at least part of its movement from the first position to the second. The cooperation between the first lip and the inner wall enables, at least during a first use, a fraction of the product to be isolated and compressed in a manner to cause its expulsion through at least one dispensing aperture. The return of the mobile element from the second position to the first when the actuator is released is accompanied by the entry of air into the container.

At each actuation, the fraction, or dose, of product isolated from the full volume of product held in the container is sprayed out of the device during the movement from the first position to the second position.

The total volume of product to be dispensed diminishes at each repeat actuation. But the dose isolated from this total product volume is reproducible at each actuation, until the total volume of product becomes less than the volume of one dose. The spray is thereby more consistent at each actuation. In effect, the cooperation between the first lip and the inner wall facilitates the formation of a temporary chamber in which the dose is pressurized. Preferably, at least during the first few sprays, insofar as the total remaining volume of product allows, the temporary chamber is filled solely with product, and the air/product ratio does not unduly affect the spray of product from the temporary chamber. Furthermore, this temporary chamber is formed in a mechanical and reproducible manner at each repeat actuation. Therefore the spraying action obtained is consistent throughout the life of the device until the product contained therein is fully discharged or nearly fully discharged.

Preferably, to form this temporary chamber, the inner wall of the container is configured so that, over at least part of the movement of the movable element between the first and second positions, the lip of the movable element is in leaktight contact with the inner wall of the body. When the movable element is lowered from its first position towards the second, the lip is initially free inside the product. Then, from an intermediate position, the lip comes into contact with the inner wall, and is then pressed resiliently against it. This pressure increases from the intermediate position towards the second position. To this end, the container can incorporate a narrowing of its inner circumference, for example in proximity to the bottom, with the lip coming into contact with this constriction to ensure leaktight contact during its movement from the first to the second position.

Alternatively, the bottom of the container body can incorporate means to engage with this lip. In this case, the bottom is preferably a fitted element and they are readily molded separately.

Advantageously, the inner wall can be circular in transverse cross-section, and the lip can be annular, with and the distance between a longitudinal axis X of the device and the inner wall preferably decreasing progressively in the direction of movement from the first position to the second.

In addition, or alternatively, the inner wall of the body can include another lip intended to engage with a widening of the outer circumference of the movable element, with the movable element being configured so that, over at least part of its movement between the first and second positions, this other lip is in leaktight contact with the outer circumference of the movable element.

In contrast to the operation of a conventional pump body, the device according to the invention does not require a priming phase to ensure that the pump body chamber is filled. In conventional pumps, after each repeat actuation, the lifting motion of the actuating element causes the pump body chamber to fill for the next spray. In the device according to the invention, the whole of the remaining total volume of product is held in the same reservoir. The risk of a gradient being formed, or of deterioration of the isolated fraction of product relative to the remainder, is thereby reduced as compared with conventional pump bodies.

In the case of the invention, it is not necessary to have a pump body with a fixed chamber, the simple movement of the movable element from the first to the second position facilitates formation of the temporary chamber containing the dose of product which will be sprayed by virtue of this action. When the movable element is depressed to its fullest extent, the pressure of the product isolated in the temporary chamber rises. In addition, when it reaches a certain level, this insertion movement opens at least one inlet channel connecting the temporary chamber to the outlet aperture. The dose of product is then expelled via this channel and sprayed through the outlet aperture.

To enable the product to be sprayed, the dispensing aperture of the device is in selective communication via an opening/closing system between at least one inlet channel and the temporary chamber. In practice, communication between the dispensing aperture and the inlet channel is established after the intermediate position is passed, and at the latest when the movable element is in the second position.

In accordance with an illustrated example, the inlet channel can be delineated between an element integral with the body of the container, obtained for example by molding with the container, and an element integral with the movable element, obtained for example by molding with the movable element. Parts of the element integral with the body of the container and parts of the element integral with the movable element can participate in forming the temporary chamber. The dispensing aperture is then formed in the actuating element mounted on the movable element, and the inlet channel is extended by a conduit disposed between the movable element and the actuating element as far as the dispensing aperture. In this particular case, the opening/ closing system can be formed by cooperation between an element integral with the body of the container obtained, e.g., by molding with the body, and an element integral with the movable element obtained, e.g., by molding with the movable element. The opening/closing system is preferably in direct continuity with the inlet channel.

In parallel with the rising movement from the second position to the first, the lip of the movable element, enabling the temporary chamber to be formed, detaches from the inner wall at the intermediate position, and the inner volume is no longer divided into two separate volumes.

A device according to the invention can be made with a minimal number of components, whereas in conventional systems the number of components can be as many as ten. By virtue of this, in the device according to the invention, assembly operations are minimized or reduced. The production cost is therefore extremely low.

The number of sprayings that can be produced with the device according to the invention matches the total number of doses contained in the product volume. The doses are more consistent or reproducible. For example, this number can be between 10 and 20 doses, for spray volumes on the order of 0.5 ml, for example. Preferably, only a residual volume less than the volume of a single whole dose cannot, a priori, be sprayed correctly from the container. The loss of product is therefore small or minimal.

Furthermore, in conventional pumps, the volume of product dispensed is, for example, compensated either by a vent aperture as described above, or by a reduction in the volume of the container. In the latter case, the bottom is in a non-fixed axial position, and following each actuation, lifts a rack-and-pinion type non-return mechanism preventing it from retracting when the movable element moves from the first position to the second.

Advantageously with the invention, the device can include a fixed bottom. In effect, a negative pressure can be tolerated in the container according to the invention if the inner volume is such that the air/liquid ratio is on the order of $1/3$ to $2/3$. By virtue of this ratio, the negative pressure created in the container after several actuations does not unduly affect the isolation of a dose of product in the temporary chamber, or on the subsequent spraying action. In a variant, the intake of air can be provided without the use of a vent aperture, with this intake obtained simply by the return movement of the movable element relative to the container.

In effect, the upper lip can be applied in a leaktight manner against the inner wall of the container so as to delineate an inner volume of the container, at least in the first position. In a variant, this upper lip is presented on an outer circumference of the actuating element which surmounts the mobile element. In this case also, the upper lip can also participate in maintaining the leaktightness of the device at rest.

During the movement from the first position to the second, cooperation between the upper lip and the inner wall of the container causes all of the product and the air contained in the reservoir to be compressed. If there are any captive air bubbles in the product, which is generally an incompressible liquid, there will be a tendency for the air bubbles contained therein to be compressed as the pressurization proceeds. The volume of these air bubbles will decrease as the movable element approaches the second position, thus facilitating their rise towards the gas phase. The risk of isolating a fraction of product including bubbles will thus be reduced.

Optionally, to further assist the operation, the inner wall can be configured so that, on at least part of the return movement of the movable element, or of the actuating element, from the second position to the first, the upper lip is momentarily not in leaktight contact with the inner wall. For example, the inner wall can incorporate a lug configured to break the leaktight contact established with the upper lip. After passing over this lug, at least during return movement from the second position to the first, breakage of the seal formed between this upper lip and said wall allows air to enter the container. Preferably, this lug is placed in proximity to the second position, and entry of air is thus permitted as soon as the movable element leaves this second position. On the other hand, in the case where air bubbles have become trapped in the product, and in the case where this lug is also configured to break the seal during movement from the first position to the second, given its position in proximity to the point at which the second position is reached, operation of the device can prevent or reduce the presence of bubbles in the product even at this stage.

During the period when the upper lip is not in leaktight contact with the inner wall of the container, entry of air into the internal volume takes place. This intake of air serves to avoid the development of negative pressure in the reservoir.

Advantageously, the movable element is preferably spring mounted. The movable element is returned from the second position to the first by the action of a resilient means of return. Preferably, this resilient means of return is in compression between the bottom of the container and the movable element at least in the second position.

In a first example, the resilient means of return is obtained by molding with the body of the container and/or with the movable element. The resilient means can be made, for example, of POM (polyoxymethylene), or polypropylene or polyethylene, so that it has a desirable elasticity.

In another example, the resilient means of return is obtained by molding with the actuating element, with the actuating being held on the container body so that the resilient means is at least compressed in the second position.

For example, the resilient means of return can be configured in the form of a stack of at least three rings linked in pairs via two diametrically opposite spacers, the spacers separating a first ring from a second ring adjacent to the first being offset, e.g., by 90° relative to the spacers separating the second ring from a third ring adjacent to the second and arranged on the side of the second opposite the first. As a variant, the resilient means of return can include a fitted spring such as a helical spring, for example made of plastic or metal, placed between the movable element and the bottom of the container.

Thus, when the user relaxes the pressure exerted on the actuating surface, the movable element rises axially under the effect of the spring in the opposite direction to that of the container bottom. Simultaneously with this rising movement, the upper lip of the movable element tends to move radially away from the axis as the radial resilient pressure to which it is subjected diminishes, so that it remains in engagement with the inner wall of the container. However, by virtue of the inertia of the material forming the upper lip and the slight negative pressure that develops when the rising movement is initiated, this radial movement is less rapid than the abrupt rising movement. By virtue of this, there is time for air to enter the variable volume before the upper lip re-establishes the seal against the inner wall of the container.

To obtain an input of air between the inner wall of the container and the upper lip of the mobile element, various parameters can be brought into play and adjusted relative to each other. These parameters can include one or more of the following:

i) The material forming the upper lip: The material can be selected so that the radial movement of the free edge of the upper lip under the effect of its resilience is slower than the rising movement of the movable element. A material of the polyolefin family, for example polyethylene, has proven to be satisfactory. For this reason, it is preferable for the lip to be formed on the movable element, as the actuating element is generally made in another material imparting other technical characteristics.

ii) The configuration of the upper lip, in particular its thickness or its inclination at rest. This configuration can effectively have an impact on the double relative movement to which it is subjected during the movement from the second position to the first.

iii) The profile of the inner wall of the container, and in particular the variation in distance between the upper lip and the inner wall of the container, between the first and second positions.

iv) The resilience of the means returning the movable element to the second position. Its resilience is preferably sufficient to cause the movable element to rise rapidly when the actuating pressure on the actuating surface is relaxed.

Advantageously, the surface of the actuating element is preferably movable over a travel distance greater than the travel of the remainder of the actuating element. Communication between the inlet channel and the dispensing aperture can be established in response to the movement of the surface of the actuating element when the remainder of the latter is axially immobile. To this end, the actuating surface can be domed and rimmed by an annular portion of lesser thickness, so as to permit inversion of the profile of the actuating surface when the remainder of the actuating element is axially immobilized.

The second position of the movable element can be determined by engagement of a lower end of the movable element with the container bottom, or with any other stop element encountered by the movable element or by any other element to which the movable element is connected.

Assuming that the second position is determined by the engagement of an annular rim of the movable element with the container bottom, it can be advantageous for the annular rim to be notched, or for the container bottom to incorporate projections capable of maintaining communication between the inlet channel and the temporary chamber.

The container bottom can be a fitted base, and attachment of the bottom to the body of the container can be achieved, for example, by means of a snap-on fixing, screwing, gluing or welding. In this case, a closure plug can be obtained by molding with the body of the container, with the plug being molded in the open position and connected to the body by a strip of material, and with the plug being provided to close off an opening in the bottom of the body.

Advantageously, the dispensing aperture can be fed by a plurality of swirl-effect channels. The channels can be made either in the part of the body traversed by the dispensing aperture, or in any other part in proximity to the dispensing aperture (e.g., the movable element, intermediate component).

Preferably, before first use, the resilient means of return is not compressed in the container, and the movable element and the container are capable of being held in a preliminary position preventing compression of the resilient means of return.

Preferably, the container can include a snap-on catch intended to engage with a counterpart profile on the movable element so as to immobilize the movable element relative to the container before the first use.

BRIEF DESCRIPTION OF THE DRAWINGS

The invention will become further apparent from the following detailed description, particularly when considered in conjunction with the drawings in which.

DETAILED DESCRIPTION OF THE PREFERRED EMBODIMENTS

Figure 1:
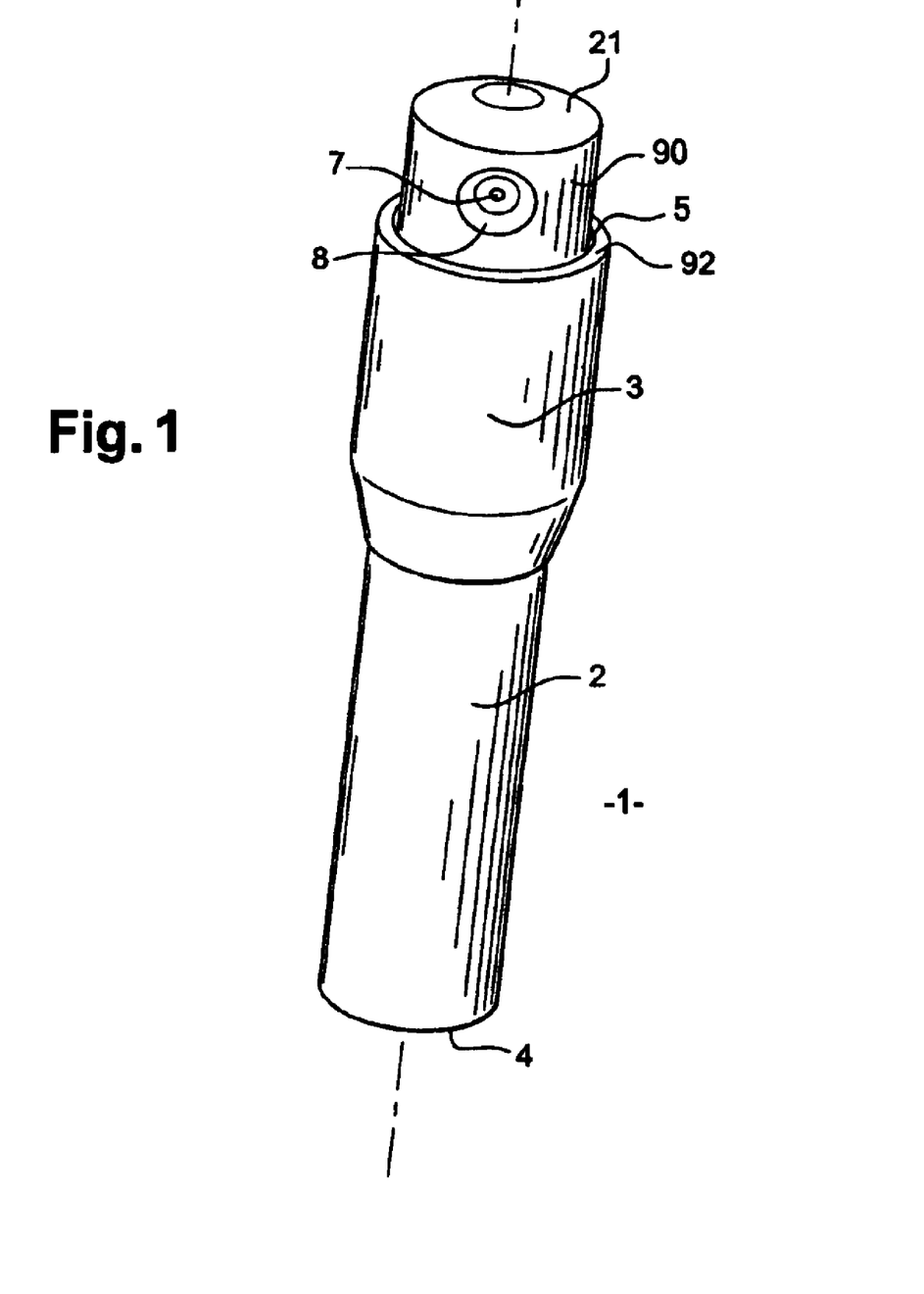
FIG. 1 shows an assembled view of an example of a device 1 according to the invention.

As shown in the illustration in FIG. 1, an example of a device 1 according to the invention includes an elongated container 2 having a cylindrical shape. The container includes a body 3 of which one end is closed by a bottom 4. The other end 5 is open. The body 3 is preferably obtained by molding, e.g., from polypropylene.

Figure 2A:
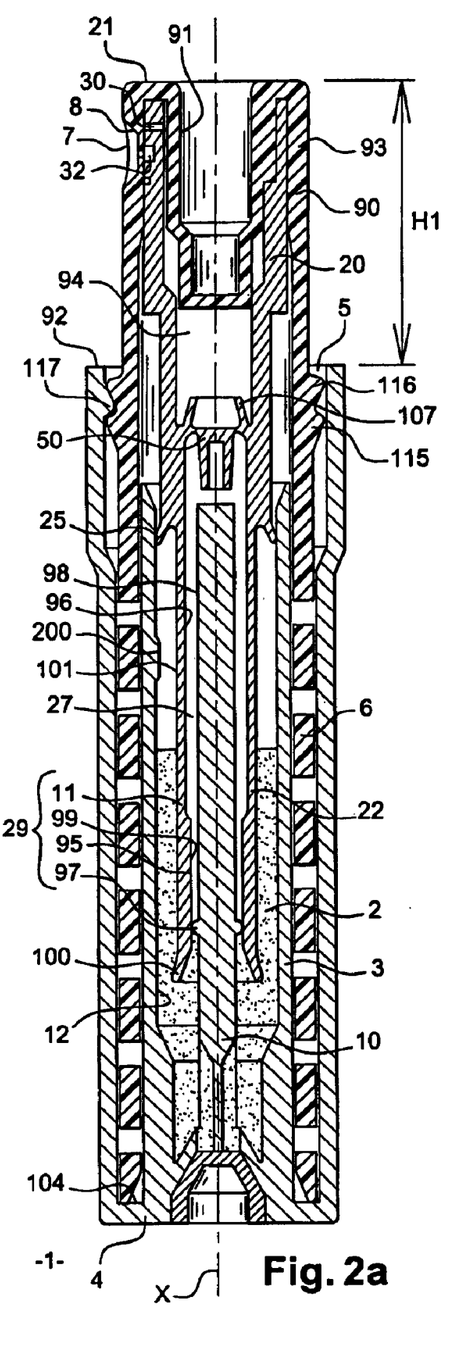
FIGS. 2a, 2b, 2c, 2d and 2e illustrate a first embodiment of a packaging and dispensing device at different stages in dispensing a dose of product.

As illustrated in FIG. 2a, an element 20, referred to herebelow as the movable element, is inserted into the body 3 via its open end 5. The movable element 20 is surmounted by a transverse actuating surface 21 of an actuating element designated generally by the reference numeral 90. In the case where the movable element 20 and the actuating element 90 are separate items, they are preferably made of different materials. The movable element 20 includes means to facilitate integral assembly with the actuating element 90. For example, the movable element 20 is inserted by force into a counterpart projection 91 on the actuating element 90.

Figure 2B:
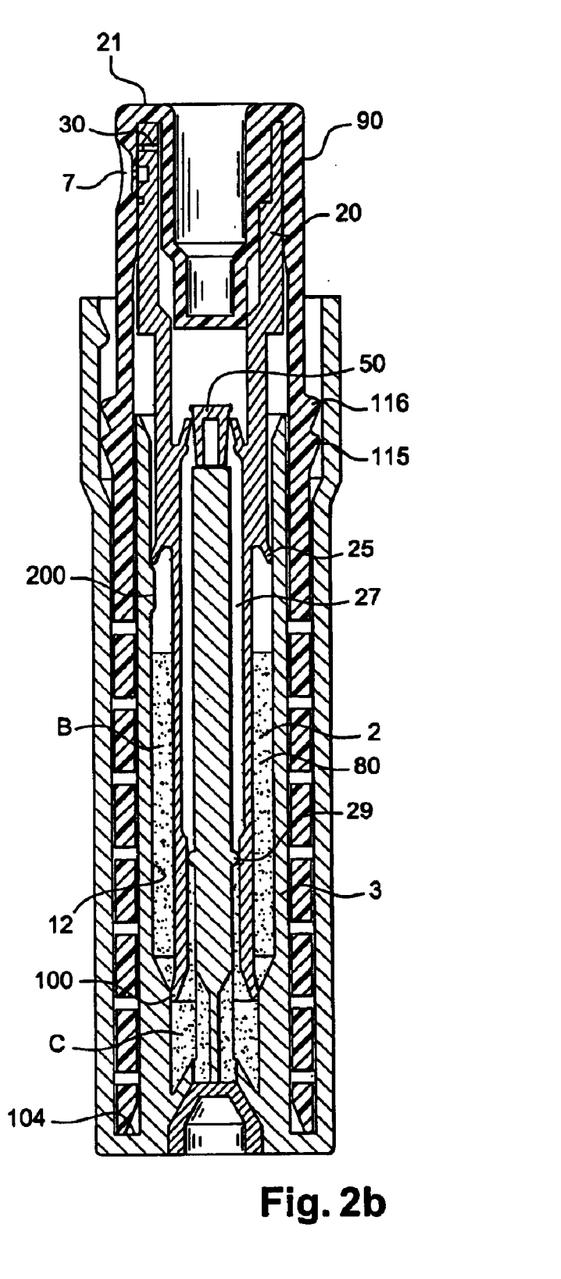
Figure 2C:
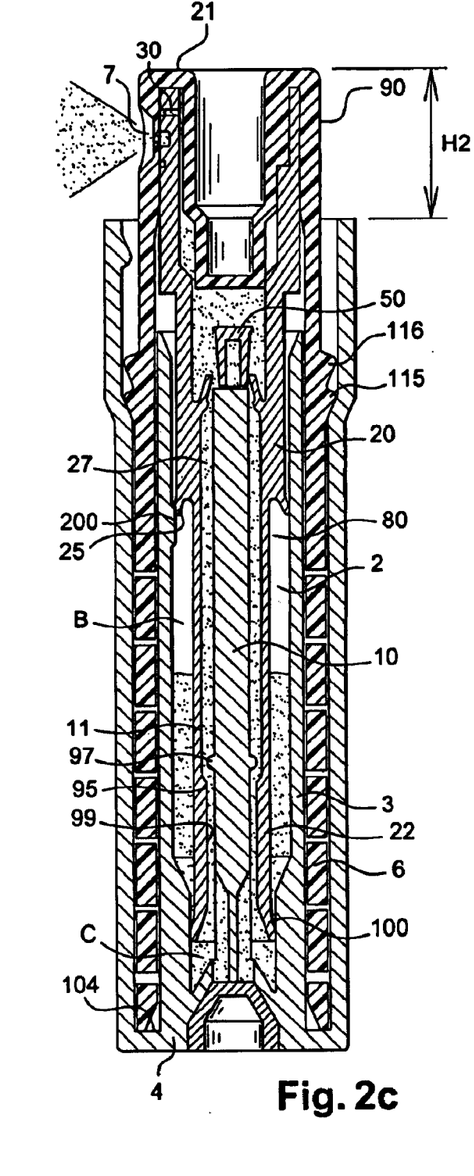
Figure 2D:
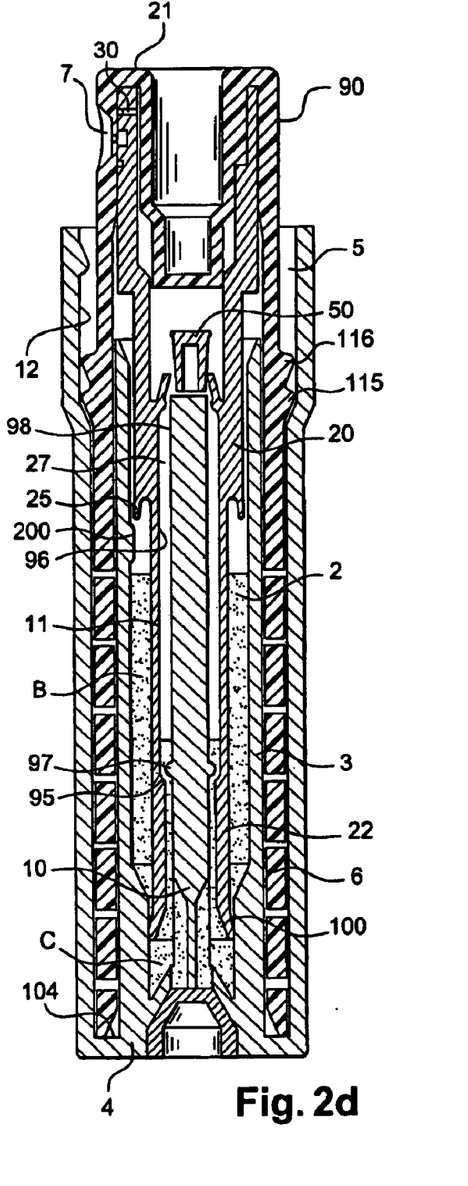
Figure 3A:
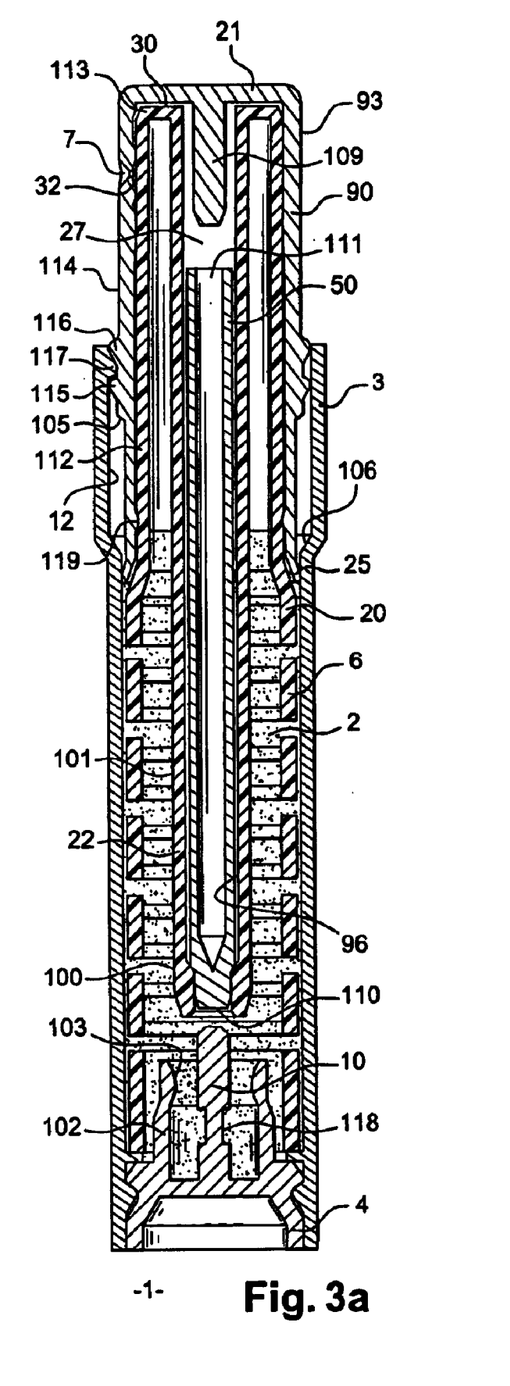
FIGS. 3a, 3b and 3c relate to a second embodiment of the packaging and dispensing device according to the invention at different stages in dispensing a dose of product.
Figure 3B:
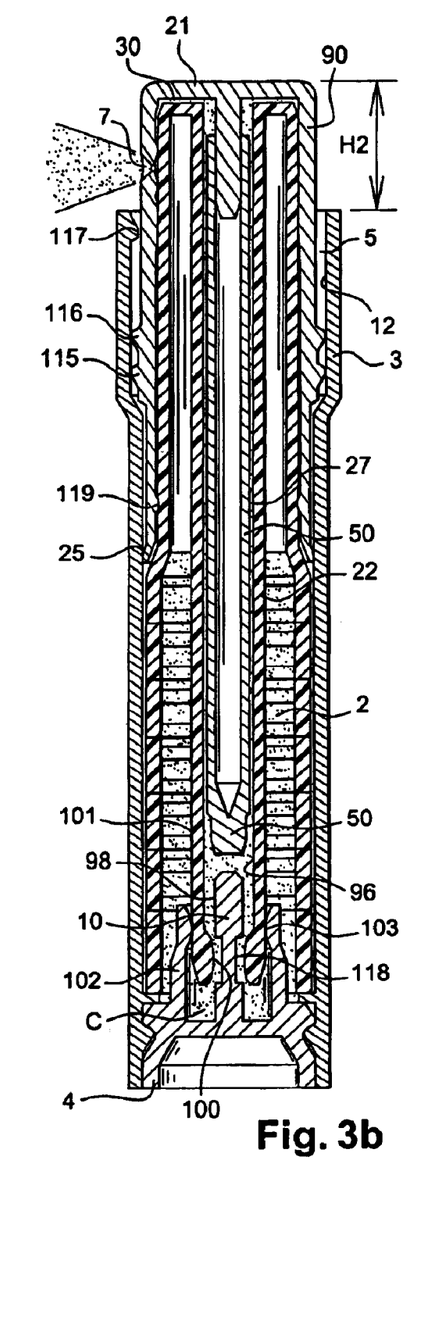
Figure 4A:
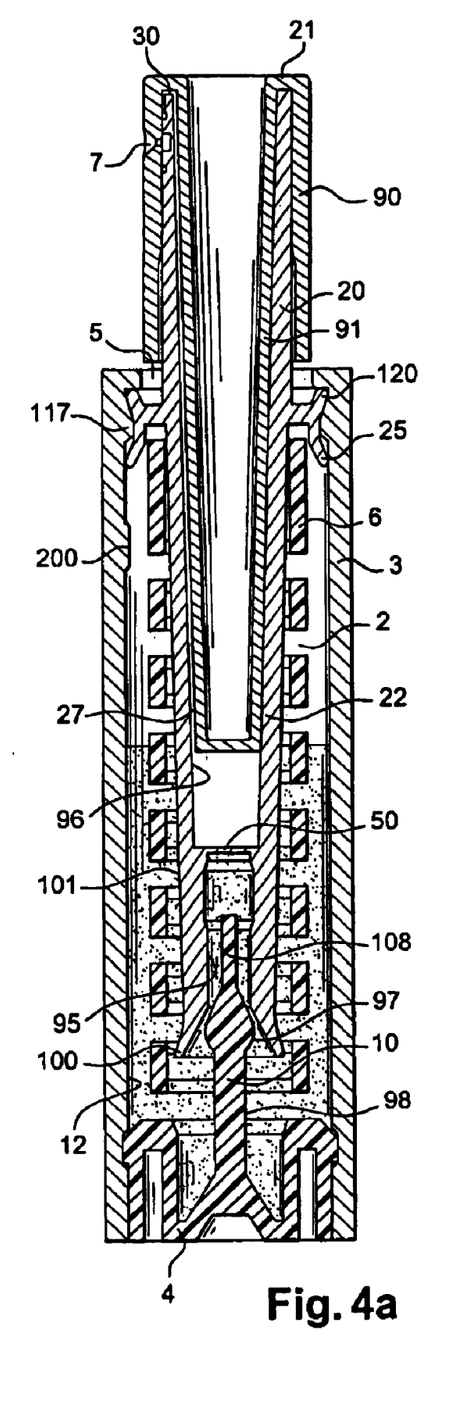
FIGS. 4a, 4b and 4c relate to a third embodiment of the packaging and dispensing device according to the invention at different stages in dispensing a dose of product.
Figure 4B:
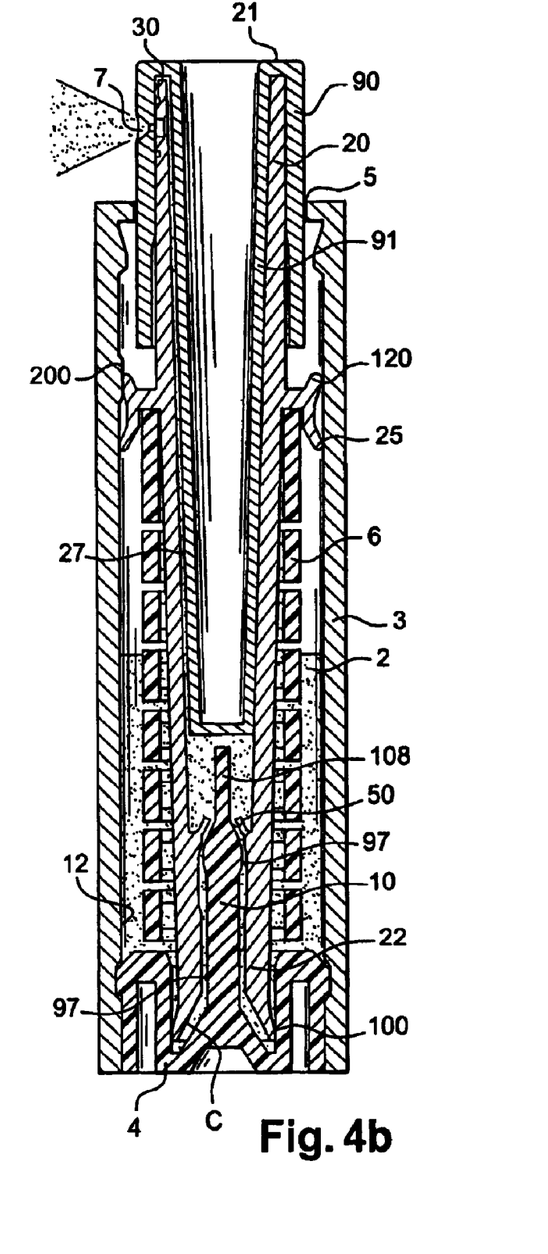

The actuating element 90 is capable of causing the movable element 20 to move relative to the body 3 along a principal lengthwise axis X of the device 1. The actuating element 90 and the movable element 20 are capable of moving principally between at least two positions:

a first position, at rest, illustrated in FIGS. 2a, 3a, and 4a, and a second position, referred to as the "pressed" position, in which a dose of product can be sprayed, illustrated in FIGS. 2c, 3b and 4b.

Figure 2E:
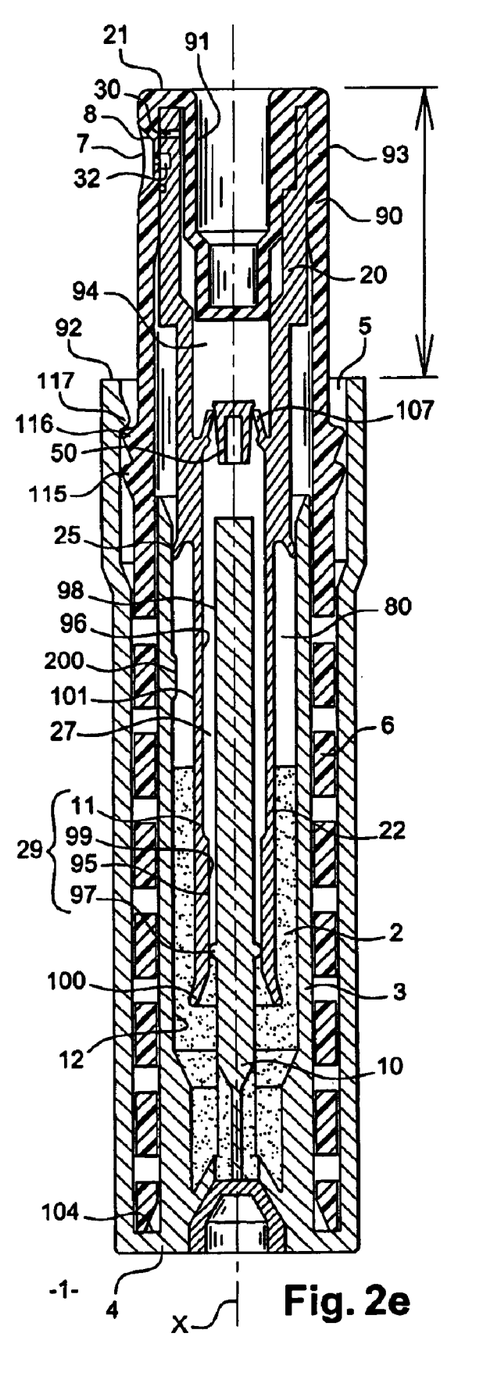

In accordance with an optional preferred feature, a pre-first use position (e.g., as shown in FIG. 2a) can be established at a higher position than the first position for subsequent uses (e.g., as shown in FIG. 2e) as discussed further hereinafter. Thus, a first position can be considered to correspond, for example, to the position of FIG. 2e. The movable element 20 and the actuating element 90 extend beyond the open end 5. In the first position, the actuating element 90 projects by a height H1 relative to a rim 92 delineating the opening 5. In the second position, shown in FIG. 2c, it projects by a height H2 lower than the first height H1. The actuating element 90 includes a skirt 93 surrounding the movable element 20, this skirt 93 being traversed by a dispensing aperture 7 in its permanently visible part which always projects beyond the open end 5. The dispensing aperture 7 emerges at a setback 8 in the outer circumference of this wall. The product is sprayed from the aperture 7.

The bottom 4 is preferably fitted with an element 10 extending axially along the axis X into the container 2 towards the open end 5. The movable element 20 preferably includes a hollow tubular side skirt 22 placed inside the container 2. This skirt 22 has an inside diameter slightly greater than an outside diameter of the element 10. It is mounted at least partially around this element 10. When the movable element 20 is moved between the first and the second position, at least one section of this skirt slides along the element 10.

An inlet channel 27 is thus defined inside the skirt 22, notably between the skirt 22 and the element 10. This inlet channel 27 emerges at an upper part of the skirt 22. As shown in the illustrated example, at the level of a section in this upper part 94 of the skirt 22, projecting beyond the open end 5, a radial passage 30 through the thickness of the skirt 22 serves to connect the inlet channel 27 to the outlet aperture 7.

The inlet channel 27 preferably has a reduced total volume, and to this end the actuating element 90 generally includes a protuberance descending inside this skirt 22 to reduce the internal volume. This protuberance is preferably the counterpart projection 91. For example, this protuberance corresponds to the counterpart means enabling attachment of the movable element 20 to the actuating element 90.

The device 1 is preferably equipped with an opening and closing system 29 for the inlet channel 27. This system 29 is obtained by a cooperation between a first means 95 provided on the inner circumference 96 of the skirt 22 and a second means 97 provided on an outer circumference 98 of the element 10. The respective heights of these two means are determined relative to the positions that can be assumed by the skirt 22 along the axis X by virtue of the travel of the actuating element 90 between the first position and the second position. The preferred choice is to have the system 29 open for positions of the skirt 22, which travels integrally with the actuating element 90, close to the second position.

In the first embodiment, the first means 95 can be formed by providing the skirt 22 with an inner wall having variable inside diameter according to the section considered relative to the axis X. The second means 97 then corresponds to a lateral annular protuberance 97 presented on the element 10 intended to come into contact with the inner wall 96, depending on the position of the skirt 22 along the axis X. The skirt 22 then presents an inside diameter at a lower part 99 smaller than the diameter of a higher intermediate part 11 relative to the axis X. When the skirt 22 is in its high or raised position, at rest, the lateral protuberance 97 comes into contact with the lower part 99, whereas in the second position, illustrated in FIG. 2c, the lateral protuberance 97 is no longer in contact with the inner wall 96, and the system 29 is open. In this second position, the lateral protuberance 97 may be located opposite the part 11. The inner wall at the level of the part 11 can, for example, include lateral grooves to allow limited opening of the system 29.

In addition or alternatively, in a variant, a protuberance is presented on the inner circumference 96 of the skirt 22 to engage with the outer wall 98 of the element 10, this wall presenting sections of variable diameter and/or smooth and/or ribbed parts.

To facilitate formation of the temporary chamber, the movable element 20 includes, on an outer circumference 101 of its skirt 22, a lip 100 making contact with an inner wall 12 of the body 3 delineating the container 2, in proximity to the bottom 4 in the illustrated example, and preferably only during a portion of the movement from the first to the second position. This inner wall 12 can be presented by the cylindrical inner circumference of the body 3, or a projection on this inner circumference, or a tubular portion 102 (see, e.g., FIG. 3a) extending beyond the bottom 4, and possibly fitted to the body 3. For example, and notably in the case where the projection is provided, the inside diameter orthogonal to axis X defined by this inner wall 12 can decrease towards the bottom.

During the movement from the first position to the second position, the movable element 20 is lowered in the direction of the axis X, and relative to the body 3 which remains fixed. During this downward movement, as seen previously, the protuberance 97 engages with the inner circumference 96 of the skirt 22, and at the same time the lip 100 also engages with the inner wall 12.

Preferably, the device is arranged such that, during this movement from the first position towards the second, the lip 100 first comes into contact with the inner wall 12, while the system 29 is still closed, and the protuberance 97 maintains leaktight contact with the element 10. As the device is preferably used in the "upright" position, the product contained in the reservoir is stored, under the effect of gravity, at the level of the bottom 4. The engagement between the lip 100 and the inner wall 12 serves to isolate a dose of product in the temporary chamber C defined between the lip 100 and the system 29 which is still closed. This temporary chamber C is formed at an intermediate position of the movable element 20 between the first position and the second position, see FIG. 2b. During a movement from the first position to the second, the intermediate position is reached as the lip 100 comes into contact with the inner wall 12.

Then, continuing the downward movement of the movable element 20 relative to the body 3, the lip 100 remains in contact with the inner wall 12, and the pressure rises in the temporary chamber C. When the system 29 is finally in the open position, with the lip 100 still being in leaktight contact with the inner wall 12, the product is then expelled under pressure into the inlet channel 27, the radial passage 30, and finally through the dispensing aperture 7. The expulsion of liquid begins before the second position is reached. In effect, provision is made for the system 29 to open from positions close to but slightly in advance of the point where the second position is reached.

For the entire duration of the downward movement from the intermediate position to the second position, the lip 100 remains in contact with the intermediate wall 12, and the contact pressure may possibly increase. The same applies during the upward movement, where the lip 100 remains in contact with the inner wall 12 until the moment it again reaches the intermediate position. Beyond this intermediate position and until the first position is reached, the lip 100 is detached from the wall 12, the temporary chamber is not closed, and the product is redistributed uniformly at the bottom of the container 2.

The height from which the lip 100 comes into contact with the inner wall 12 is reproducible and controlled to control the volume defined in the temporary chamber. To this end, the lip 100 preferably presents a certain stability in the product so that it is not deformed under the flow of product during the movement between the first and second position.

As can be seen in the first, third and fourth embodiments respectively illustrated in FIGS. 2a–2e; 4a–4c and 6a, the lip 100 is defined so as to form a slightly tapering skirt from top to bottom around the mobile element 20. With regard to the first embodiment, the wall 12 presents a chamfered wall constricting the inside diameter of the container 2 as it approaches the bottom 4. With regard to the third and fourth embodiments, the lip 100 engages with an inner wall of the tubular portion 102 extending from the bottom 4. This tubular portion 102 can be presented on a fitted element closing off the bottom 4.

Figure 3C:
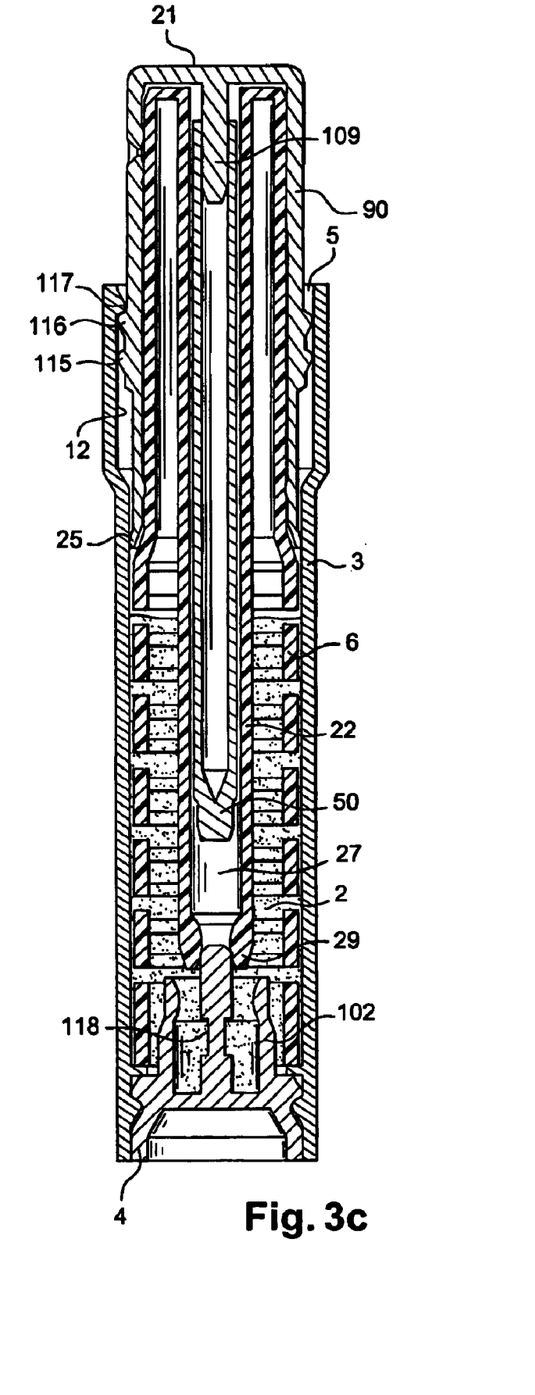

In the second embodiment, illustrated in FIGS. 3a–3c, the lip 100 is integral with the outer circumference 101 of the skirt 22 and an annular boss 103 presented by the inner wall 12 provides leaktight contact with the smooth outer wall 101 of the skirt 22.

Preferably, the device 1 includes a resilient means of return 6 to automatically return the movable element 20 from the second position to the first position. In a first embodiment, illustrated in FIGS. 2a–2e, the spring 6 is associated with the actuating element 90 engages with an outer lateral circumference 104 of the bottom 4. In the second embodiment, illustrated in FIGS. 3a–3c, the spring 6 is associated with the movable element 20. In this case, the spring 6 is immersed in the product and cooperates preferentially with the bottom 4, as indicated below. In the third and the fourth embodiments, illustrated in FIGS. 4a–4c and 6a, the spring 6 is presented by the bottom 4, and notably a fitted element on this bottom 4; it then cooperates with the movable element 20, and can also be immersed in the product.

In the first and third embodiments, the movable element 20 is intended to be inserted in a tight and leak-free manner inside the body 3. On its outer circumference 101 the movable element includes an annular upper lip 25 facing downward and tapering slightly to the outside so as to engage in a leaktight manner with the inner wall 12 of the body 3. As a variant, illustrated in FIGS. 3a–3c, the push button 30 has a lip such as 25 to perform the same sealing function with the inner wall 12. When at rest, in the first position, the upper annular lip 25 delineates a volume 80 above the bottom 4, which is a maximum volume in this position. Preferably, this volume 80 includes a fraction of product and a fraction of air.

On the side facing the dispensing aperture 7, the radial passage 30 emerges at a setback in the outer surface of the side skirt 22. With the device in the assembled position, this setback is centered on the dispensing aperture 7 and in conjunction with the inner surface of the actuating element 90 defines a plurality of swirl channels 32 in communication with the spray orifice 7 and with the radial passage 30.

A snap-on fixing can be provided between the movable element 20 and the body 3, and/or between the actuating element 90 and the body 3 of the container, so as to improve the respective attachment of one to the other.

With reference to diagrams 2a to 2e, when using the device, the consumer exerts axial pressure on the surface 21 of the actuating element 90. In response to this axial pressure, the spring 6 compresses, and the movable element 20 moves downward with its upper annular lip 25 in leaktight engagement with the inner wall 12 of the body 3, while the lip 100 is not yet in contact with this wall 12.

In so doing, the volume 80 defined between the bottom 4 and the movable element 20 decreases and the product contained therein is pressurized and rises, if this is not already the case, to the level of the opening/closing system 29 which is still in the closed position. Furthermore, this system 29 is placed low enough relative to the axis X so that the movement from the first position to the second position is all that is needed to ensure that the product rises to the height of the system 29, irrespective of the volume of product remaining in the container. This arrangement ensures that the temporary chamber will form a dose of product of reproducible volume at each actuation.

As the downward movement continues, the lip 100 comes into contact with the wall 12, the temporary chamber is then formed, and the product located in the temporary chamber and that located in the volume B defined between the upper annular lip 25 and the lip 100 are pressurized. The volume B and the volume of the chamber C added together are equal to the volume 80. By the time the second position is reached, i.e., the maximum insertion position, the system 29 moves to the open position, the product is expelled from the temporary chamber into the inlet channel 27, enters the radial passage 30 and the swirl channels 32, and is sprayed from the dispensing aperture 7.

The second position is defined by the arrival at the end stop 105 of the actuating element 90, or of the movable element 20 against a part 106 of the body 3.

When the user relaxes the pressure exerted on the surface 21 (FIG. 2d), the movable element 20 rises axially under the action of the spring 6. In so doing, air enters the container 2 via the inlet channel 27 before the system 29 recloses. Once the system 29 is closed, the protuberance 97 ceases to be located opposite the ribbed part 11 and returns to leaktight engagement with the portion 99 located below the ribbed part 11. Air can also enter the container via a space formed momentarily, as explained below, between the inner wall 12 and the upper annular lip 25.

A slight gap between the free edge of the annular lip 25 of the movable element 20 and the inner wall 12 of the body 3 is maintained during at least part of the rising movement of the movable element 20. This gap is formed during at least a portion of the return movement because, in proximity to the open end 5 the thickness of the inner wall 12 progressively decreases, and due to the inertia of the material forming the upper annular lip 25 of the movable element, and also due to the sudden pressure generated by the spring 6 and to the light negative pressure which can develop inside the container when the rising movement of the mobile element 20 starts. Air is then able to enter the container 2 so that a balance of pressures is re-established.

By way of example, as shown in FIGS. 2a–2e, the inner wall 12 can incorporate a lug 200, for example in the form of a lateral protuberance projecting radially inward towards the inside of the body 3, allowing the inner circumference of the container 2 to be locally modified so as to locally disengage the upper annular lip 25 from the inner wall 12. The leaktight contact is then broken by the passage of this lug 200. Preferably, the lug 200 is chamfered so that movement past the lug either during the passage from the first position to the second or vice-versa causes the upper lip 25 to detach from the inner wall 12. Preferably, the lug 200 is placed in proximity to the point at which the second position is reached, between the intermediate position and the second position. The upper lip 25 is preferably detached only from the moment when the first lip 100 is in contact with the inner wall 12 and the intermediate chamber C is formed. By way of example, this lug 200 has the shape of a "rice grain" and the inner wall 12 can have several lugs such as 200 evenly spaced at an annular level on the body 3.

When the movable element 20 reaches its upper position (FIG. 2e), the free edge of the upper annular lip 25 re-establishes leaktight contact with the inner wall 12 of the container body. The volume 80 is again at its maximum. The device is ready for a fresh actuation.

At the next actuation, everything proceeds in the same manner, except that the volume pressurized by the mobile element is reduced by the volume of product dispensed at the previous actuation, the latter having been replaced, entirely or partially, by a corresponding volume of air.

Although not clearly shown on the drawings, when a quantity of liquid is retained, such as by capillary action, inside the inlet channel 27, notably just above the system 29, the spraying of product at the next actuation is more or less concurrent with the downward movement of the actuating surface 21. As this residual volume is minimal, it does not significantly modify the dose of product delivered in a single spraying action.

Figure 5A:
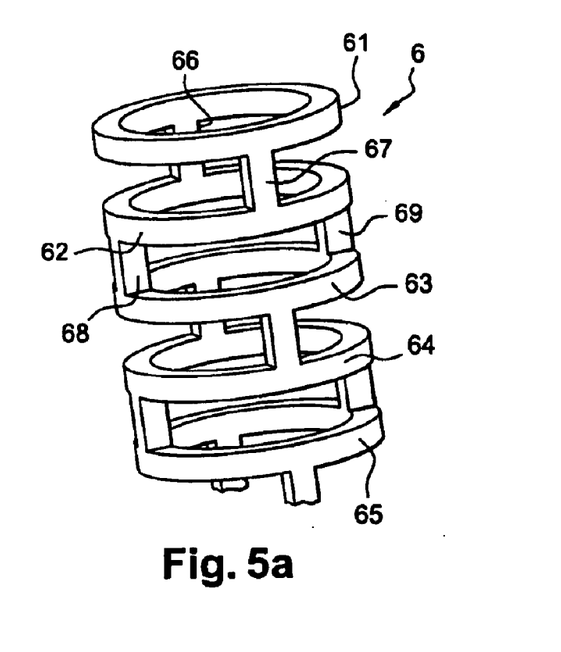
FIGS. 5a and 5b relate to an alternative embodiment of a spring arranged in such a packaging and dispensing device according to the invention.
Figure 5B:
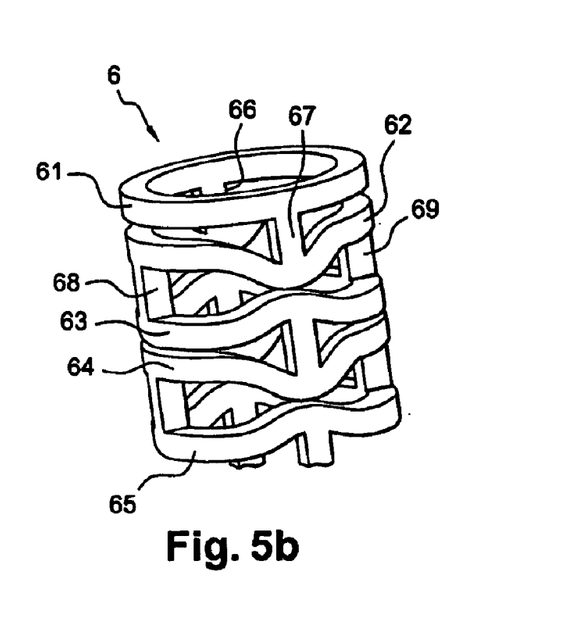

In the embodiment just described, the resilient means of return 6 is configured in the form of a helical spring. A variant is illustrated in FIGS. 5A and 5B, with FIG. 5B corresponding to a view of the spring 6 in the compressed state relative to FIG. 5A. The spring 6 is configured in the form of a stack of several rings 61, 62, 63, 64, 65. Two successive rings 61 and 62 are held apart by two diametrically opposite spacers 66 and 67, while rings 62 and 63 are held apart by two spacers 68 and 69 offset, by 90° in the illustrated example, relative to spacers 66 and 67, and so on throughout the stack.

In compression, and as illustrated in FIG. 5B, rings 61–65 in the stack converge in pairs towards each other, with maximum convergence, or even contact, at the points situated at 90° relative to the spacers.

By virtue of the 90° offset between the spacers of a pair of rings and the spacers of the pair(s) of rings adjacent to it, the stack compresses uniformly. In particular when the spring 6 is obtained by molding a thermoplastic material, in order to limit its wear over time and notably to avoid any creep effect in the structure of the spring, before it is used for the first time, the spring 6 is preferably placed in the container 2 in a non-compressed state. The device 1 can therefore be stored for a long period without losing its functionality. Even if the first use only occurs two years after the packaging of such a device 1, operation of the spring 6 will still be optimal, its elasticity never having been tested up to that point. Furthermore, because the volume of product contained in the container 2 is small, the life of such a device after first use is short, for example, on the order of two months, and thus the spring 6 can be maintained at least slightly compressed without compromising its optimal performance.

In the illustrated example, an outer circumference 114 of the movable element can include a double ridged annular profile 115, 116 (or more than two ridges) intended to engage with a snap-on catch 117 presented on the inner wall 12 (see, e.g., FIGS. 2a, 3a). Preferably, this snap-on catch 117 is presented on a section of the wall 12 having a larger diameter than the section against which the upper annular lip 25 is applied. The double profile is preferably configured so as to form two projections 115 and 116, at two different height levels relative to the axis X.

In FIG. 2a, the device 1 is shown before first use, with the snap-on catch 117 locked between the two annular profiles 115 and 116.

The merit of the double annular profile is that it enables the position of the mobile element 20 to be locked relative to the container 2 before the first use. On first use, the upper annular profile 116 is forced under the snap-on catch 117. Beyond this point, the spring 6 is then compressed. An upper position of the movable element 20, after this first use, as illustrated in FIG. 2e, will then correspond to a position in which the upper annular profile 116 is held under the snap-on catch 117, relative to the axis X. The movable element 20 will project a little less beyond the container 2 after this first use.

As a variant, the respective positions of the snap-on catch 117 and the annular profiles 115 and 116 can be reversed, with the snap-on catch then being provided on the movable element 20 and the double annular profile on the inner wall 12. In a further variant, the snap-on catch can form an annular snap ring and the double profile can be formed from two non-annular catches intended to engage with said annular snap ring.

Figure 4C:
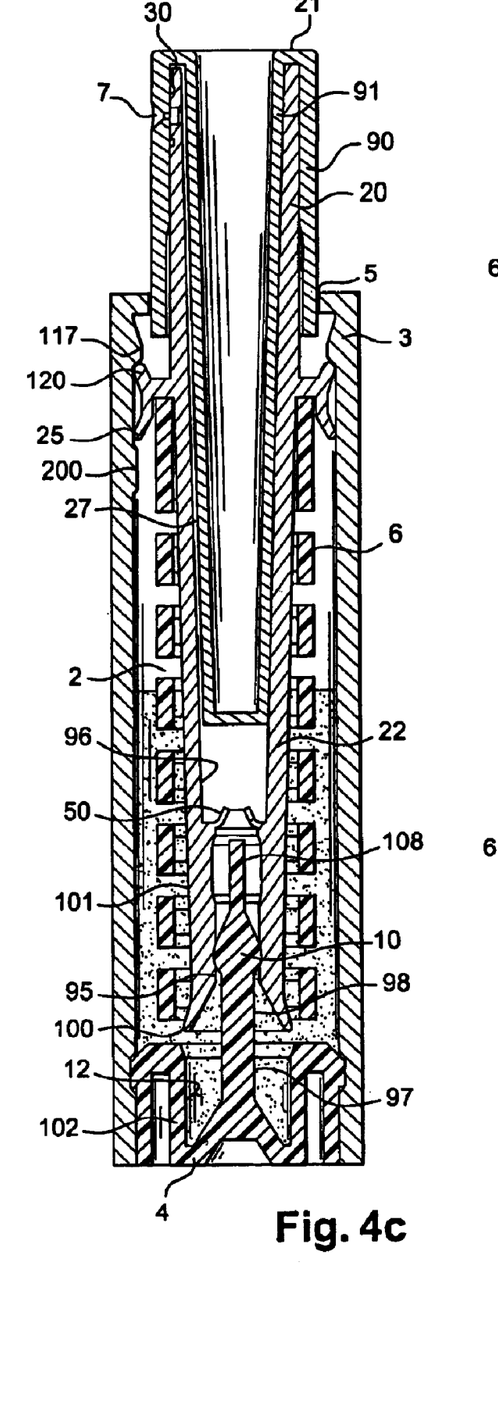

As illustrated in FIGS. 2a–2e, 3a–3c and 6a, the double annular profile is presented on the outer circumference of the actuating element 90. As a variant, as illustrated in FIGS. 4a–4c, the double annular profile can be provided on the outer circumference 96 of the skirt 22, one of the profiles also forming the upper lip 25.

Alternatively, the device can also be locked in this preliminary storage position, before first use, by a bridge of material (not shown) formed between the container 2 and the movable element 20, with this bridge of material being capable of being broken at the first use.

The spring in the configuration just described in reference to FIGS. 5A and 5B is also suitable for use in all embodiments of the device which will be described below.

Preferably, the device 1 according to the invention is equipped with a means 50 to ensure the leaktightness of the dispensing aperture 7, even before the first use. This means 50 serves to increase the degree of leaktightness already conferred by the system 29 which is closed in the at-rest position. The means 50 is initially sealed inside the skirt 22, above the element 10. The means 50 can also be a cap force fitted inside the skirt 22.

The means 50 must allow the product to enter the inlet channel 27 when pressure is exerted on the actuating element 90 for the first time. As the means 50 is still integral with the skirt 22 at this first actuation, it is driven towards the element 10. When the element 10 comes into contact with the means 50, a slight resistance is felt at the actuating surface 21. The user must then apply a slightly greater pressure so that the connection between the means 50 and the inner circumference of the skirt 22 is broken, or so that the means 50 is pushed into a part of the skirt 22 of larger inside diameter. The means 50 is then free in this zone, and when the mobile element 20 moves from the first position to the second, the means 50 does not completely obstruct the inlet channel 27.

In the case where the means 50 is formed by a cap, as illustrated in FIG. 2a, it preferably has a chamfered shape such that its widest outer circumference is in leaktight contact at a level on the inner circumference 96 of the skirt 22. This inner circumference 96 preferably includes, above this level of contact, an elastically deformable crown 107 through which the means 50 can pass when it is pushed upwards by the element 10 inside the skirt 22.

In a first variant, illustrated in FIGS. 4a–4c and 6a corresponding respectively to the third and fourth embodiments of the invention, the means 50 can be formed from a film arranged transversely, in a leaktight manner, in contact with the inner circumference of the skirt 22. This film is capable of being pierced by the element 10 which includes a point 108 so as to break the seal and permanently open up the inlet channel 27 during the first actuation.

In a second variant, notably illustrated in FIGS. 3a–3c corresponding to the second embodiment of the invention, the means 50 can be formed by a cap of the kind illustrated in FIG. 2a. However, with this arrangement, the cap has a length such that in cooperation with the element 10, the cap 50 can be pushed against a counterpart means 109 on the actuating element 90, on which it can be retained in an integral manner after the first actuation. For example, the means 50 is tubular in shape and closed at a first end to ensure initial leaktightness at the inner wall 12, and open at an opposite end to engage with the counterpart means 109. The element 10 pushes this means 50 by bearing against the first closed end 110, so that the counterpart means 109 is inserted by force, at the open end 111, into this tubular shape. This variant makes it possible to control the position of the means 50 in the inlet channel 27, notably to permanently immobilize it (or couple it to the counterpart element 109) for subsequent movements of the actuating element between the first and second positions.

The presence of the sealing means 50 enables the container 2 to be filled in the "upturned" position, the actuating element 90 and the movable element 20 being already assembled in the body 3, and the body 3 incorporating an aperture for filling via the bottom 4. A cap is provided to close off this filling aperture. The upper annular skirt 25 also provides a leaktight seal between the body 3 and the movable element 20.

It is to be understood that various modifications are possible within the scope of the present invention. For example, the device 1 described above can be formed by modifying the position of the spring 6, and/or by modifying the way in which the temporary chamber is formed, and/or by modifying the position or the structure of the upper annular lip 25, and/or by modifying the initial sealing system 50, and/or by modifying the internal structure of the container 2.

The second, third and fourth embodiments illustrated respectively in FIGS. 3a–3c, 4a–4c and 6a are variants of the first embodiment. For reasons of clarity of the description, only those elements which differ from the previous embodiment will be described in detail.

For example, in the second embodiment, illustrated in FIGS. 3a–3c, the bottom 4 is fixed to the body 3 by means of a snap-on attachment. The spring 6 is obtained by molding with the movable element 20, and it is immersed in the product. The spring 6 is surmounted by a tubular portion 112 connected via a flat part 113 to a second tubular portion forming the skirt 22. This second tubular portion is arranged inside the first tubular portion and even includes a part extending inside the turns of the spring 6. In effect, the skirt 22 is sufficiently long such that one of its ends is intended to be immersed in the product, at least for the second position.

The actuating element 90 with its outer side skirt 91 below the actuating surface 21, also has an upper annular lip such as 25 on its outer circumference 114 to ensure the leaktightness of the container 2. The radial passage 30 is formed directly between the flat part 113 of the movable element 20 and the actuating surface 21.

At the level of this outer circumference 114, the movable element includes the double ridged annular profile 115, 116 intended to engage with the snap catch 117 presented on the inner wall 12. Preferably, this snap catch is presented on a section of the wall 12 of larger diameter than the section against which the upper annular lip 25 is applied. The double profile is preferably configured so as to form two projections 115 and 116 at two different height levels relative to the axis X. In FIG. 3a, the device 1 is shown before first use, with a first annular profile 115 locked under the snap catch 117. The movable element is then locked in the container 2, between the bottom 4 and the actuating element 90.

In this position, the means 50 is disposed in a leaktight manner inside the tubular skirt 22.

The bottom 4 includes a tubular portion 102 standing relative to the bottom 4 inside the container 2. The element 10 also stands at the center of this tubular portion 102. At this location, the tubular portion 102 constitutes a mini-receptacle with a diameter substantially smaller than that of the body 3. It also incorporates an annular bead 103 on its inner circumference, and thus forms the equivalent of the inner wall 12 intended to cooperate with the outer circumference 101 of the skirt 22. In effect, as illustrated in FIG. 3b, when the device 1 is lowered to the second position, the spring 6 is compressed to its maximum degree, the annular bead 103 is in contact with the outer circumference 101 of the skirt 22, and the element 10 has permanently pushed the means 50 onto the counterpart means 109. And the inner circumference 96 of the skirt 22 is not in leaktight contact with the outer circumference 98 of element 10, which places the system 29 in the open position. A spray of product is thus obtained.

In the present case, when the skirt 22 moves downward relative to the tubular portion 102, and relative to the element 10, the outer circumference 101 of the skirt first comes into contact with the inner bead 103, and at this moment the inner circumference 96 of the skirt 22 is still in leaktight contact with the element 10 to keep the system 29 closed. The element 10 includes a section 118 having a smaller diameter close to the bottom 4. In proximity to the second position, the inner circumference 96 of the skirt 22 is opposite this portion 118, and the system 29 is opened and the product is sprayed.

When the actuating element rises to its first position, under the effect of the spring 6 on the movable element 20, it does not rise as high as in the position before first use. In effect, the second projection 116 first comes into contact with the snap catch 117 and thus limits the upward movement. The spring 6 is therefore more compressed in the first position than in the position before first use.

In FIG. 3c, it can be seen that the initial sealing means 50 is now integral with the actuating means 90, and is held by a force fit on the counterpart means 109. The inner circumference 96 of the skirt 22 is in leaktight contact with one end of the element 10 and the system 29 is therefore closed. However, the skirt 22 is raised sufficiently high so that it is no longer in contact with the inner bead 103 of the tubular portion 102. The liquid is therefore distributed in a uniform manner at the level of the bottom 4. The bottom 4 is preferably arranged so that a volume defined in the container 2, around the tubular portion 102, is minimal, or null. This has the effect of limiting the quantity of product which does not enter the tubular portion 102 by gravity.

This embodiment allows the body 3, inside which the actuating element 90 and the movable element 20 are already assembled, to be presented under a filling device which then places a defined volume of product into the container 2 in the "upturned" position. It then only remains to assemble the fitted cap to form the bottom 4 and complete the construction of the device 1. In the case where the container is filled in this way, the movable element 20 is mounted in the outer side skirt 91 of the actuating element so that a leaktight seal 119 is formed between the actuating element 90 and the movable element 20, well below the level where the aperture 7 is provided.

In the third embodiment, illustrated in FIGS. 4a–4c, the body 3 includes a fitted base 4 which presents a spring arrangement 6 inside the container with which it is obtained by molding. This fitted base also incorporates the substantially cylindrical element 10 projecting into the container 2, and a tubular portion intended to locally reduce the inside diameter of the body 3.

The spring 6 bears against a collar projecting beyond an outer circumference of the skirt 22 formed by the movable element 20. Two conversely flared skirts extend out from this collar. A first flared skirt extending downward defines the upper annular skirt 25, while a second flared skirt 120 extending upward defines a projection intended to engage with a snap catch 117 presented on the inner wall 12 of the body 3.

During the downward movement towards the second position, the second flared skirt passes under the snap catch 117. The spring 6 is compressed until a temporary chamber is formed between the end of the lip 100 of the skirt 22 on one hand, and the closed system 29 on the other. The system 29 is obtained by cooperation between the inner wall 96 of the skirt 22 and the outer circumference 98 of the element 10. The inner wall 96 and the outer circumference 98 respectively or alternatively incorporate projections 95 and 97 intended to make leaktight contact with each other, at least in certain positions relative to the axis X.

Figure 6A:
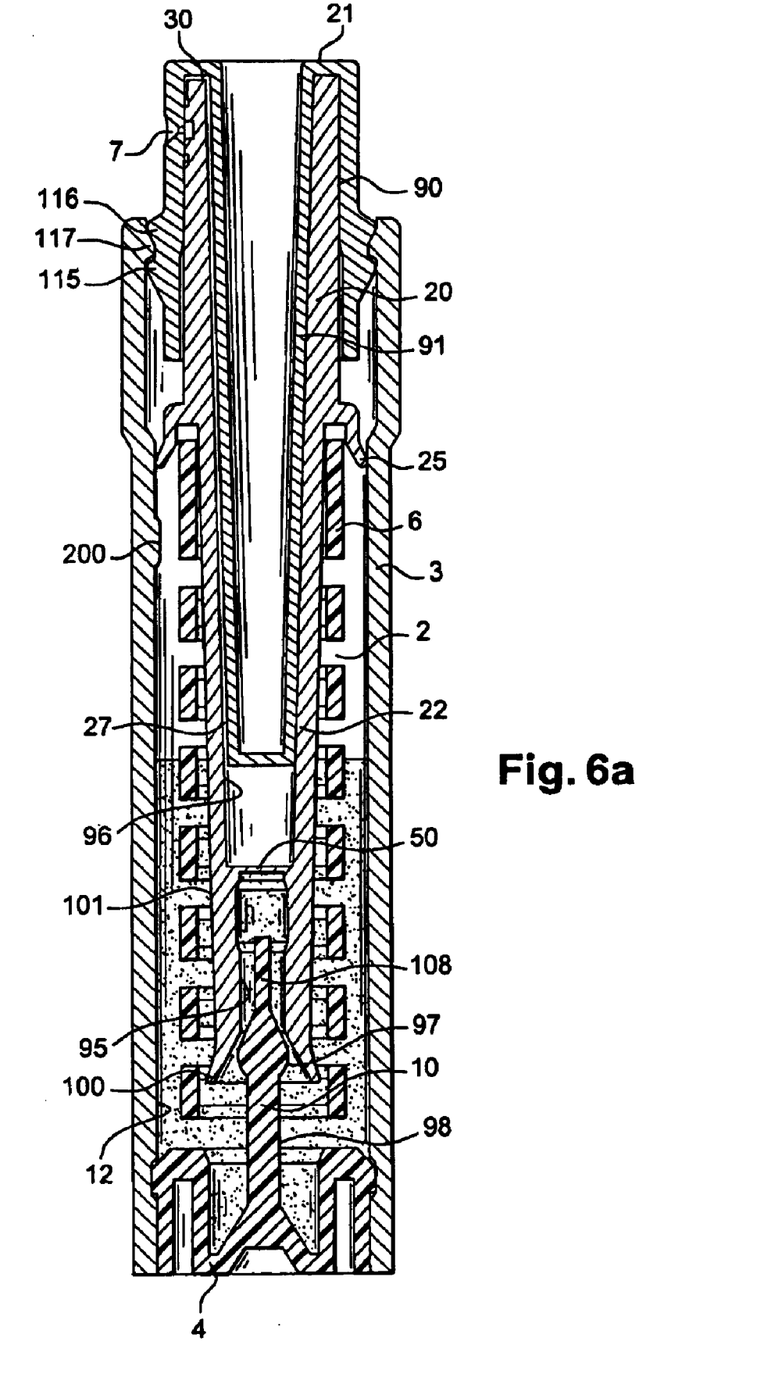
FIG. 6a relates to a fourth embodiment of the packaging and dispensing device according to the invention before first use.

The fourth embodiment, illustrated in FIG. 6a, is a variant of the third embodiment, with the difference that the collar extending from the outer circumference of the skirt 22 has only one slightly flared skirt so as to define only the upper lip 25. In this fourth embodiment, the snap catch 117 is provided on the inner circumference of the container 2 to engage with a double profile presented on the outer circumference of the actuating element 90 which in this case is arranged to descend at least partially into the container 2.

In the foregoing detailed description reference is made to preferred embodiments of the invention. It is evident that variants thereto can be provided without departing from the spirit of the invention as claimed herebelow.

As discussed earlier, the invention can be particularly advantageous for packaging/dispensing small quantities of products, such as tester or sample sizes of cosmetic products. For example, the invention can be particularly advantageous for sample sizes of perfume products. By way of example, the dose disposed during each spray can be one-tenth to one-twentieth of the volume of the product initially provided in the container. Further, by way of example, volume of product initially provided in the container can be one-third to two-thirds of the volume defined between the movable element in the first position and the bottom of the container. For example, the device can be equipped with at least a second spring of which the compression force is preferably different from that of the resilient means of return 6.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A device for packaging and dispensing of a product, comprising:
    (a) a container to hold the product, the container being delineated by a body having a closed bottom at one end, the container body including an inner wall;
    (b) a movable element having an actuating element associated therewith, wherein said movable element is movable relative to the body of the container and capable, in response to an action exerted manually on a surface of the actuating element, of moving from a first position in which a first lip of the movable element is at a non-zero distance from the inner wall to a second position in which the first lip is engaged with said inner wall; and
    wherein the movable element includes an upper lip capable of bearing in a leaktight manner against said inner wall during at least part of its movement from the first position to the second position, and wherein the first lip and the inner wall cooperate to enable, at least during a first use, a dose of said product to be isolated and compressed to cause expulsion of the product through at least one dispensing aperture, and further wherein a return movement of the movable element from the second position to the first when the actuating element is released is accompanied by an entry of air into the container.

2. A device according to claim 1, further including a means to ensure leaktightness of the device before the first use, and wherein the means to ensure leaktightness is made integral with the actuating element after the first use.

3. A device according to claim 2, wherein the dispensing aperture is in selective communication, via an opening/closing system, with at least one inlet channel in communication with the dose of product inside the container.

4. A device according to claim 1, wherein the dispensing aperture is in selective communication, via an opening/closing system, with at least one inlet channel in communication with the dose of product inside the container.

5. A device according to claim 4, wherein the inlet channel is delineated between an element associated with the body of the container and a skirt associated with the movable element.

6. A device according to claim 5, wherein the element associated with the body of the container is molded integrally with the body of the container, and wherein the skirt associated with the movable element is integrally molded with the movable element.

7. A device according to claim 5, wherein the opening/closing system is formed by cooperation between an element integral with the body of the container and an element integral with the movable element.

8. A device according to claim 7, wherein the element associated with the body of the container is integrally molded with the body of the container and wherein the element associated with the movable element is integrally molded with the movable element.

9. A device according to claim 4, wherein the opening/closing system is formed by cooperation between an element integral with the body of the container and an element integral with the movable element.

10. A device according to claim 1, wherein the first lip is subjected to a resilient constraint which increases as the movable element is moved toward the second position.

11. A device according to claim 10, wherein the container includes a narrowing inner circumference which narrows in proximity to the bottom, and wherein the first lip comes into contact with the narrowing circumference to provide the resilient constraint.

12. A device according to claim 1, wherein the container includes a narrowing inner circumference which narrows in proximity to the bottom, and wherein the first lip comes into contact with the narrowing circumference.

13. A device according to claim 1, wherein the inner wall has a circular transverse cross-section, and wherein the first lip is annular, and further wherein the distance between a longitudinal axis of the device and said inner wall decreases in a direction of movement from the first position to the second position.

14. A device according to claim 1, wherein the inner wall of the container includes a second lip which engages with an outer circumference portion of the movable element, and wherein the movable element is configured so that, over at least part of the movement between said first and second positions, the second lip is in leaktight contact with said outer circumference portion.

15. A device according to claim 14, wherein said outer circumference portion of said movable element is widened relative to an adjacent portion of said movable element.

16. A device according to claim 1, wherein the dose corresponds to a volume of one-tenth to one-twentieth of a volume of product held in the container before the first use.

17. A device according to claim 16, wherein said container contains a cosmetic product.

18. A device according to claim 16, wherein the container contains a perfume product.

19. A device according to claim 1, wherein a volume of product initially held in the container corresponds to a volume of one-third to two-thirds of an internal volume defined in the first position between the movable element and the bottom of the container.

20. A device according to claim 1, wherein said container contains a cosmetic product.

21. A device according to claim 1, wherein the container contains a perfume product.

22. A device according to claim 1, wherein the upper lip ensures leaktightness of the reservoir in the first position.

23. A device according to claim 1, wherein the entry of air into said volume takes place via at least one passage formed between the movable element and the inner wall of the container.

24. A device according to claim 23, wherein the at least one passage includes a passage between the upper lip and the inner wall.

25. A device according to claim 1, wherein the inner wall incorporates a lug configured to break the leaktight contact established with the upper lip during at least a portion of the movement from the second position to the first position.

26. A device according to claim 1, further including resilient means to urge the return movement of the movable element from the second position to the first position.

27. A device according to claim 26, wherein one end of the resilient means bears against the bottom of the container.

28. A device according to claim 26, wherein the resilient means is formed by molding with the body of the container.

29. A device according to claim 26, wherein the resilient means is formed by molding with the actuating element.

30. A device according to claim 26, wherein the resilient means is formed by molding with the movable element.

31. A device according to claim 26, wherein the resilient means is formed of a material selected from the group consisting of POM, polypropylene, and polyethylene.

32. A device according to claim 26, wherein the resilient means includes a stack of at least three rings linked in pairs via two diametrically opposite spacers, the spacers separating a first ring from a second ring adjacent to the first being offset by 90° relative to the spacers separating the second ring from a third ring.

33. A device according to claim 26, wherein the resilient means includes a fitted spring made of plastic.

34. A device according to claim 26, wherein the resilient means includes a fitted spring made of metal.

35. A device according to claim 1, wherein the first lip includes a polyolefin material.

36. A device according to claim 1, wherein the first lip includes a polyethylene material.

37. A device according to claim 1, wherein the bottom of the container is a fitted base attached to the body of the container by one of a snap-on fixing, a screw-on fixing, an adhesive, and a weld.

38. A device according to claim 1, wherein the dispensing aperture is fed by a plurality of swirl-effect channels.

39. A device according to claim 26, wherein before the first use, the resilient means is disposed in the container in an uncompressed state.

40. A device according to claim 1, wherein the container includes a snap catch which engages with a counterpart profile on the movable element so as to immobilize the movable element relative to the container before the first use.

41. A device according to claim 1, wherein said movable element is formed of a different material than said actuating element.

42. A device according to claim 1, wherein at least one inlet channel provides selective communication between the dose of product inside the container and the dispensing aperture, and wherein the inlet channel is closed during a first part of the movement of the movable element from the first position to the second position, and further wherein the inlet channel is open during a second part of movement of the movable member from the first position to the second position.

43. A device according to claim 42, wherein the first lip contacts the inner wall at an intermediate position between said first position and said second position.

44. A device according to claim 43, wherein said inlet channel is closed during movement of said movable member from said first position to said intermediate position.

45. A device according to claim 44, wherein said inlet channel is opened after said movable element moves past said intermediate position during movement from said first position to said second position.

46. A device according to claim 42, wherein an opening/closing system provides selective opening and closing of said inlet channel for the selective communication, the device further including a seal which seals the inlet channel prior to the first use.

47. A device according to claim 46, wherein said seal is broken during the first use of said device.

48. A device according to claim 42, wherein said movable element returns to a position after the first use which is lower than a position of said movable element before the first use.

49. A device according to claim 1, wherein said movable element returns to a position after the first use which is lower than a position of said movable element before the first use.

50. A device for packaging and dispensing a product comprising:
 (a) a container containing the product, the container including a container body;
 (b) a dispensing aperture through which a dose of the product exits the device;
 (c) a movable element which at least partially extends into the container body, wherein said movable element is movable relative to said container body between a first position and a second position, and wherein an intermediate position of said movable element is between said first position and said second position, and wherein said movable element engages a portion of the container body at said intermediate position to form a temporary chamber which isolates a dose of product from remaining product in said container, and wherein during at least a portion of movement of said movable member from said intermediate position to said second position said dose is expelled through said dispensing aperture, and further wherein during at least a portion of movement of said movable member from said second position to said first position air enters into said container, and wherein the movable element further includes an upper lip which engages with an inner wall of the container during at least a portion of movement of the movable member from the first position to the second position.

51. A device according to claim 50, wherein the product in said container is a cosmetic product.

52. A device according to claim 50, wherein the product in said container is a perfume product.

53. A device according to claim 50, further including an actuating element associated with said movable element, and wherein said movable element moves in response to a force exerted upon said actuating element.

54. A device according to claim 53, wherein said movable element is formed of a different material than said actuating element.

55. A device according to claim 50, wherein at least one inlet channel provides selective communication between the dose of product inside thee container and the dispensing aperture, and wherein the inlet channel is closed during a first part of the movement of the movable element from the first position to the second position, and further wherein the inlet channel is open during a second part of movement of the movable member from the first position to the second position.

56. A device according to claim 55, wherein said inlet channel is closed during movement of said movable member from said first position to said intermediate position.

57. A device according to claim 56, wherein said inlet channel is opened after said movable element moves past said intermediate position during movement from said first position to said second position.

58. A device according to claim 55, wherein an opening/closing system provides selective opening and closing of said inlet channel for the selective communication, the device further including a seal which seals the inlet channel prior to the first use.

59. A device according to claim 58, wherein said seal is broken during the first use of said device.

60. A device according to claim 50, wherein said movable element returns to a position after the first use which is lower than a position of said movable element before the first use.

61. A device according to claim 50, wherein during movement of said movable element from said first position to said immediate position said movable element is spaced from said container body.

62. A device according to claim 50, wherein said movable element includes a first lip which engages said portion of the container body between said intermediate position and said second position.

* * * * *